(12) United States Patent
Fang et al.

(10) Patent No.: US 9,049,734 B2
(45) Date of Patent: Jun. 2, 2015

(54) METHOD, APPARATUS AND SYSTEM FOR RESOURCE IMMEDIATE ASSIGNMENT

(71) Applicant: Huawei Technologies Co., Ltd., Shenzhen (CN)

(72) Inventors: Ming Fang, Shanghai (CN); Jiyong Wang, Shanghai (CN); Bing Shu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 167 days.

(21) Appl. No.: 13/774,420

(22) Filed: Feb. 22, 2013

(65) Prior Publication Data

US 2013/0163502 A1 Jun. 27, 2013

Related U.S. Application Data

(63) Continuation of application No. PCT/CN2011/074974, filed on May 31, 2011.

(30) Foreign Application Priority Data

Aug. 24, 2010 (CN) .......................... 2010 1 0268981

(51) Int. Cl.
*H04Q 9/00* (2006.01)
*H04W 72/12* (2009.01)
*H04W 72/04* (2009.01)

(52) U.S. Cl.
CPC .......... *H04W 72/121* (2013.01); *H04W 72/042* (2013.01); *H04W 72/0406* (2013.01)

(58) Field of Classification Search
CPC .................................................. H04W 72/0406
USPC .................................. 370/312, 329; 455/450
See application file for complete search history.

(56) References Cited

U.S. PATENT DOCUMENTS

| 7,068,623 | B1 | 6/2006 | Barany et al. |
| 2001/0018348 | A1* | 8/2001 | Joshi et al. ................. 455/450 |

(Continued)

FOREIGN PATENT DOCUMENTS

| CN | 101188863 A | 5/2008 |
| CN | 101569233 A | 10/2009 |

(Continued)

OTHER PUBLICATIONS

Telefon AB LM Ericsson, ST-Ericsson, "Rach Capacity Evaluation for MTC" Agenda Item 7.2.5.3.2, 3GPP TSG GERAN #46. Jeju, South Korea, Apr. 17-21, 2010, 6 pages.
Huawei Technologies Co., Ltd., "AGCH enhancement and performance comparison" 3GPP TSG GERAN WG2 #47bis, Agenda Item 5.3.2.1, 5.3.2.2. Vienna, Austria, Oct. 19-22, 2010, 5 pages.

(Continued)

*Primary Examiner* — Wanda Z Russell
(74) *Attorney, Agent, or Firm* — Brinks Gilson & Lione

(57) ABSTRACT

Embodiments of the present invention disclose a method, an apparatus, and a system for resource immediate assignment, which includes: constructing an immediate assignment message according to channel request messages of at least two terminals, where the immediate assignment message assigns a channel resource for the at least two terminals according to the channel request messages of the at least two terminals; and sending the immediate assignment message out. By implementing the embodiments of the present invention, in a case that a valid byte of an immediate assignment message is unchanged, one immediate assignment message can assign a packet resource for at least two terminals, thereby satisfying an access requirement of more terminals.

13 Claims, 5 Drawing Sheets

(56) References Cited

U.S. PATENT DOCUMENTS

| | | | |
|---|---|---|---|
| 2009/0219856 A1 | 9/2009 | Richardson et al. | |
| 2010/0080125 A1 | 4/2010 | Olsson et al. | |
| 2011/0274042 A1* | 11/2011 | Diachina et al. | 370/328 |
| 2013/0029680 A1* | 1/2013 | Park et al. | 455/450 |
| 2013/0100839 A1* | 4/2013 | Arora et al. | 370/252 |
| 2013/0148618 A1* | 6/2013 | Navratil et al. | 370/329 |

FOREIGN PATENT DOCUMENTS

| | | |
|---|---|---|
| CN | 101594678 A | 12/2009 |
| CN | 101778413 A | 7/2010 |
| EP | 1727387 A2 | 11/2006 |
| WO | WO 2009/102252 A1 | 8/2009 |

OTHER PUBLICATIONS

Office Action issued in corresponding Chinese Patent Application No. 201010268981.X, mailed Jul. 26, 2013, 14 pages.

Written Opinion of the International Searching Authority issued in corresponding PCT Patent Application No. PCT/CN2011/074974, mailed Sep. 15, 2011.

International Search Report issued in corresponding PCT Patent Application No. PCT/CN2011/074974, mailed Sep. 15, 2011.

GSM, "$3^{rd}$ Generation Partnership Project; Technical Specification Group GSM/EDGE Radio Access Network; Mobile Radio Interface Layer 3 Specification; Radio Resource Control (RRC) Protocol" (Release 9) 3GPP TS 44.018. V9.5.0, Jun. 2010.

Huawei, 9.1.19, Immediate Assignment Extended, Apr. 2013.

* cited by examiner

| Offset value of terminal A |
| --- |
| Offset value of terminal B |
| Offset value of terminal C |
| Channel request message 1 of terminal A |
| Channel request message 2 of terminal B |
| Channel request message 3 of terminal C |
| Packet resource parameter of terminal A |
| Packet resource parameter of terminal B |
| Packet resource parameter of terminal C |

METHOD, APPARATUS AND SYSTEM FOR RESOURCE IMMEDIATE ASSIGNMENT

CROSS-REFERENCE TO RELATED APPLICATIONS

This application is a continuation of International Application No. PCT/CN2011/074974, filed on May 31, 2011, which claims priority to Chinese Patent Application No. 201010268981.X, filed on Aug. 24, 2010, both of which are hereby incorporated by reference in their entireties.

FIELD OF THE INVENTION

The present invention relates to the field of communications technologies, and in particular, to a method, an apparatus, and a system for resource immediate assignment.

BACKGROUND OF THE INVENTION

When sending uplink data or initiating a circuit-switched call, a terminal needs to send a channel request message to a network through a random access channel (RACH, Random Access Channel), so that the network assigns a packet resource to the terminal. The method specifically is: A terminal sends a channel request message, where the channel request message may be a channel request (Channel Request), a GPRS packet channel request (GPRS Packet Channel Request), or an enhanced data rates for GSM evolution packet channel request (EGPRS Packet Channel Request); and a network receives the channel request message sent by the terminal, and feeds back an immediate assignment message (IA, Immediate Assignment) on an access grant channel (AGCH, Access Granted Channel), so as to assign a packet resource for the terminal that sends the channel request message, where assigning the packet resource for the terminal is allocating a physical channel for a packet service of the terminal, the IA message needs to carry resource parameters of the allocated physical channel, and these parameters for assigning a packet resource are called as packet resource parameters. The IA message is a message that has at-most-176-bit valid information, which includes 16 bits for recording a frame number (the frame number is a), 8 to 11 bits of the total bits (Channel Request) for recording a channel request message, and the rest bytes for recording the packet resource parameters. Therefore, the length of the IA message only can be used to assign a resource parameter for one terminal. The terminal monitors, on the AGCH channel, the IA message fed back by the network and parses the IA message, and determines whether a resource allocated by the IA message is for the terminal by comparing a field (the frame number a and the channel request) carried in the IA message with a channel request message sent by the terminal and a frame number of a frame that sends the Channel request message, so as to successfully obtain the resource allocated by the IA message; and if not, ignores the IA message.

Because a channel request sent by the terminal may be lost due to a radio interference noise or has a collision with a channel request initiated by another terminal, the network cannot successively receive the channel request sent by the terminal. In this way, if the terminal does not receive a response of the network in an S period, the terminal may re-initiate a channel request. A rule for re-initiating a channel request by the terminal is described as follows: The terminal can send, on the RACH, the channel request for M+1 times at most, where the parameter M is broadcast by the network and is controlled by the network. After the terminal re-sends the channel request for the $M^{th}$ time, regardless whether it is successful or not, this access process is ended and the access request is not re-sent. The number of TDMA frames in an interval between next time for sending the channel request and last time for sending the channel request is randomly selected from {S, S+1, S+T-1}, where T is a parameter "Tx integer" (Tx_integer) broadcast on a BCCH, and a value of S is determined by the configuration of a CCCH, and the value of S is shown in the following Table 1:

TABLE 1

| Tx | Uncombined CCCH | Combined CCCH/SDCCH |
|---|---|---|
| 3, 8, 14, 50 | 55 | 41 |
| 4, 9, 16 | 76 | 52 |
| 5, 10, 20 | 109 | 58 |
| 6, 11, 25 | 163 | 86 |
| 7, 12, 32 | 217 | 115 |

In a general case, if the IA message monitored by the terminal is a response to any one of last three channel requests of the terminal, it is considered that the IA is valid, then re-initiation of the channel request message is stopped, and a service is performed on an assigned channel.

With the development of communications technologies, "machine" to "machine" (M2M, Machine to Machine) communication connects various endpoint devices or subsystems at everywhere through multiple communications technologies and gathers them to a management system, so as to implement management and service for a device. At present, communication relevant to a "machine" is collectively referred to as machine type communication (MTC, Machine Type Communication).

Currently, a case that a large number of MTC terminals randomly initiate an access request exists.

SUMMARY OF THE INVENTION

An embodiment of the present invention provides a method for resource immediate assignment, where the method includes:

constructing an immediate assignment message according to channel request messages of at least two terminals, where the immediate assignment message assigns a packet resource for the channel request messages of the at least two terminals; and sending the immediate assignment message out.

The present invention further provides a method for resource immediate assignment, where the method includes:

monitoring an immediate assignment message of an access grant channel, where the immediate assignment message allocates a resource parameter for at least two terminals; and decoding the immediate assignment message and determining whether the immediate assignment message assigns a packet resource parameter for a terminal; if yes, obtaining a resource that is allocated by the immediate assignment message for the terminal; and if not, ignoring the immediate assignment message.

The present invention further provides a base station subsystem, which includes:

a message constructing module, configured to construct an immediate assignment message according to channel request messages of at least two terminals, where the immediate assignment message assigns a packet resource for the channel request messages of the at least two terminals; and a message sending module, configured to send the immediate assignment message out.

The present invention further provides a terminal, which includes:

a message monitoring module, configured to monitor an immediate assignment message of an access grant channel, where the immediate assignment message allocates a resource parameter for at least two terminals; and a message decoding module, configured to decode the immediate assignment message and determine whether the immediate assignment message assigns a packet resource parameter for a terminal; if yes, obtain a resource that is allocated by the immediate assignment message for the terminal; and if not, ignore the immediate assignment message.

The present invention further provides a communication system, which includes:

a base station subsystem, configured to construct an immediate assignment message according to channel request messages of at least two terminals, where the immediate assignment message assigns a packet resource for the channel request messages of the at least two terminals; and send the immediate assignment message out; and a terminal, configured to monitor an immediate assignment message of an access grant channel, where the immediate assignment message allocates a resource parameter for at least two terminals; decode the immediate assignment message and determine whether the immediate assignment message assigns a packet resource parameter for a terminal; if yes, obtain a resource that is allocated by the immediate assignment message for the terminal; and if not, discard the immediate assignment message.

In the embodiments of the present invention, an immediate assignment message is constructed according to channel request messages of at least two terminals, where the immediate assignment message assigns a packet resource for the channel request messages of the at least two terminals; and in a case that a valid byte of the immediate assignment message is unchanged, one immediate assignment message can assign a packet resource for at least two terminals, thereby satisfying an access requirement of more terminals.

BRIEF DESCRIPTION OF THE DRAWINGS

To describe the technical solutions in the embodiments of the present invention more clearly, the accompanying drawings required for describing the embodiments are briefly introduced in the following. Apparently, the accompanying drawings in the following description show merely some embodiments of the present invention, and persons of ordinary skill in the art may still derive other drawings from these accompanying drawings without creative efforts.

DETAILED DESCRIPTION OF THE EMBODIMENTS

The technical solutions in the embodiments of the present invention are described clearly in the following with reference to the accompanying drawings in the embodiments of the present invention. Apparently, the embodiments to be described are merely a part rather than all of the embodiments of the present invention. All other embodiments obtained by persons of ordinary skill in the art based on the embodiments of the present invention without creative efforts shall fall within the protection scope of the present invention.

In a process of researching the prior art, the inventor of the present invention finds that, when a large number of MTC terminals access a network and request sending uplink data, the large number of MTC terminals randomly initiate an access request, so that the access amount of terminals is increased, which causes that a downlink AGCH cannot satisfy resource immediate assignment for a large number of terminals.

An embodiment of the present invention provides a method for resource immediate assignment, which can reduce the number of bits occupied in an immediate assignment message by a parameter that is relevant to a frame number; and embodiments of the present invention further provide a corresponding terminal, base station subsystem, and system, which are described in detail in the following.

Embodiment 1

Figure 1:
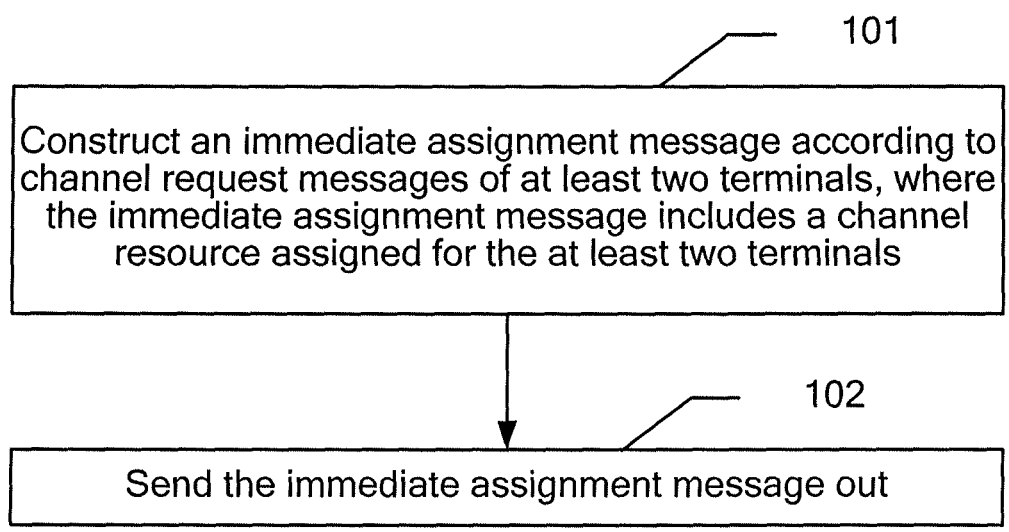
FIG. 1 is a flow chart of a method for resource immediate assignment according to Embodiment 1 of the present invention.

Reference may be made to FIG. 1 for a basic procedure of a method for resource immediate assignment according to Embodiment 1 of the present invention. In this embodiment, a large number of terminals randomly initiate an access request to request a base station to allocate a packet resource for the terminals; and the base station receives a channel request message sent by each terminal. The method for resource immediate assignment in this embodiment includes:

Step 101: Construct an immediate assignment message according to channel request information of at least two terminals, where the channel request information is used to indicate a terminal to request a channel resource, and the immediate assignment message includes a channel resource assigned for each of the at least two terminals.

Specifically, the channel request information is a channel request message such as a channel request, a GPRS packet channel request, or an EGPRS channel request; the channel resource requested by the terminal may be a packet resource; and a channel resource parameter that is for assigning a channel resource and carried in the immediate assignment message is a packet resource parameter. A base station calculates an offset value between a designated frame number of a downlink immediate assignment message and a frame number of an uplink request message of each terminal according to a frame number of a channel request message of each terminal. When receiving a channel request message sent by a terminal, the base station obtains a frame number of the channel request message sent by the terminal, designates a frame number of a frame for sending a downlink immediate assignment message, and calculates an offset value between a frame number of an uplink channel request message and a frame number of the downlink immediate assignment message. For example, terminal A sends a channel request message 1 in a frame whose frame number is 6, terminal B sends a channel request message 2 in a frame whose frame number is 7, and a downlink immediate assignment message is designated to be sent in a frame whose frame number is 13, so that two offset values exist, that is, a difference value between the frame number 6 and the frame number 13, and a difference value between the frame number 7 and the frame number 13.

An offset value is a method for describing time information of an uplink channel request message sent by a terminal, and a manner of using an absolute frame number in the prior art may also be adopted to describe the time information of the uplink channel request message sent by the terminal. The base station constructs an immediate assignment message according to time information of the sent uplink channel request message, a channel request message, and a packet resource parameter of each terminal, where the immediate assignment message is used to allocate a packet resource for each terminal. For example, offset values 7 and 5 corresponding to the two terminals are combined into an offset value field, the channel request message 1 sent by terminal A and the channel request message 2 sent by terminal B are combined into a terminal request message field, and a packet resource parameter for allocating a resource for terminal A and a packet resource parameter allocated for terminal B are combined into a parameter field, and then the offset value field, the terminal request message field, and the parameter field are combined into an immediate assignment message.

If time information of an uplink channel request message sent by a terminal is an absolute frame number, the foregoing offset value field is replaced with the absolute frame number.

If an immediate assignment message is valid only for any one of last three channel request messages of a terminal, according to the rule for re-sending a channel request message described in the background of the invention, it can be known that, a maximum value of an offset value is (S+Tx)+(S+Tx)+(S)=715, and 9 bits are needed to record the offset value. If an immediate assignment message is valid only for a last channel request message, according to the re-sending rule, it can be known that, a maximum value of an offset value is (S+Tx)=249, and 7 bits are needed to record the offset value. Compared with the original length of 16 bits for recording a frame number, the length required for recording an offset value is shorter than the length required for recording a frame number.

In addition, a packet resource parameter field in an immediate assignment message includes only a necessary packet resource parameter, so that a packet resource parameter that can be pre-configured or an unnecessary packet resource parameter may not be combined into the immediate assignment message. In this way, the number of bits of the packet resource parameter field can be reduced.

Through the foregoing two methods, the number of bits of an immediate assignment message can be reduced, so that in a case that a valid byte is unchanged, the immediate assignment message may include packet resource parameters of multiple terminals. A method of using an offset value to indicate time information of a channel request message sent by a terminal and a method of adopting a pre-configured packet resource parameter or delivering only a necessary packet resource parameter may not be used in combination. In the immediate assignment message, a packet resource parameter allocated for which terminal may be distinguished through time information of a channel request message, such as an offset value field and a terminal request parameter field.

Step 102: Send the immediate assignment message out.

In this embodiment of the present invention, an immediate assignment message is constructed according to channel request messages of at least two terminals, where the immediate assignment message assigns a packet resource for the channel request messages of the at least two terminals; and in a case that a valid byte of the immediate assignment message is unchanged, one immediate assignment message can assign a packet resource for at least two terminals, thereby satisfying an access requirement of more terminals.

To avoid redundancy, an offset value is taken as an example to describe time information of an uplink channel access request message of a terminal.

Embodiment 2

Figure 2:
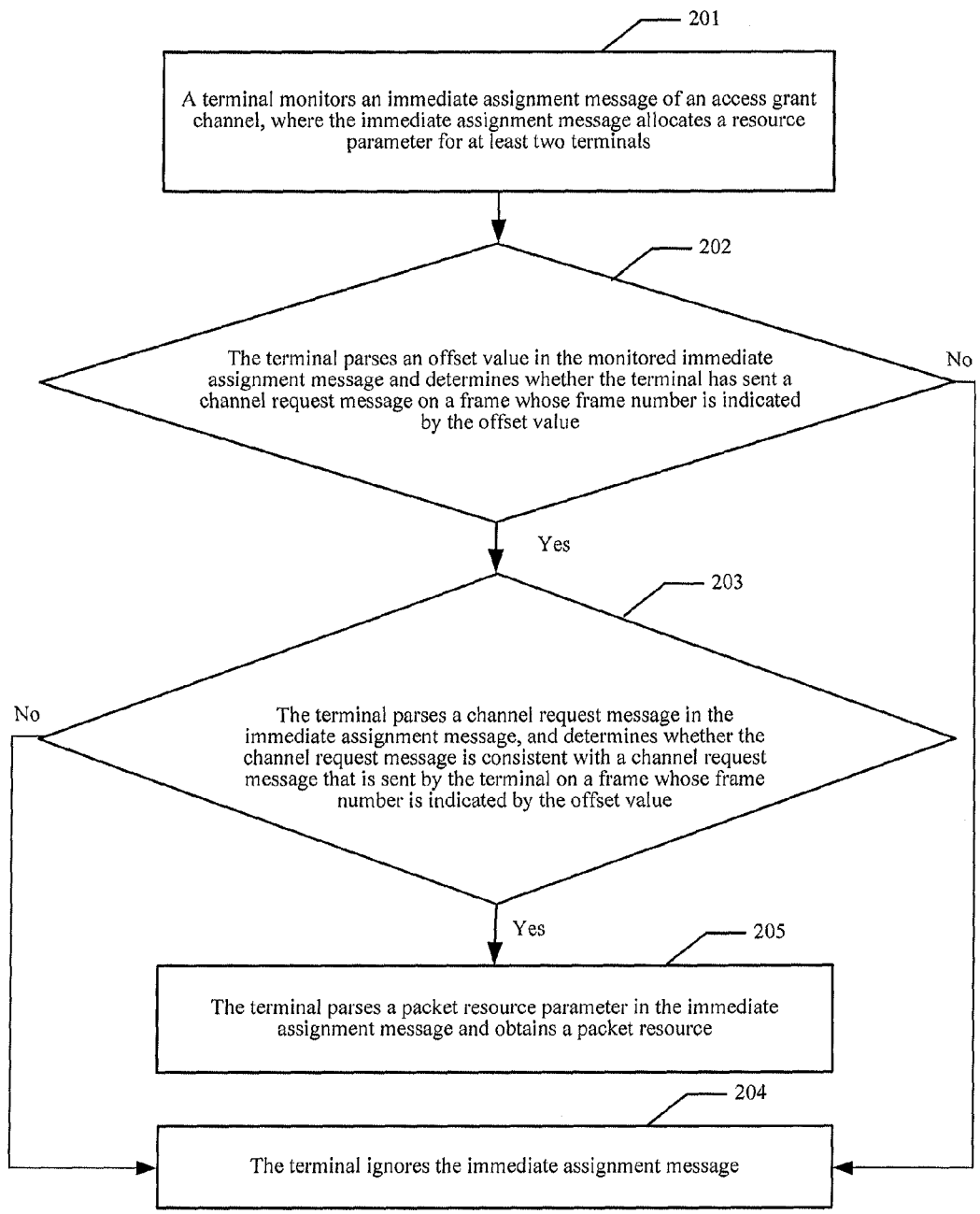
FIG. 2 is a flow chart of a method for resource immediate assignment according to Embodiment 2 of the present invention.

FIG. 2 is a flow chart of a method for resource immediate assignment according to Embodiment 2 of the present invention. The method for resource immediate assignment is described in detail in this embodiment in combination with a terminal. After sending a channel request message, a terminal starts to monitor an AGCH channel and obtains a packet resource that is allocated by a base station for the terminal. The method for resource immediate assignment includes:

Step 201: A terminal monitors an immediate assignment message of an access grant channel, where the immediate assignment message includes a resource parameter allocated for each of at least two terminals.

Step 202: The terminal parses an offset value of the monitored immediate assignment message and determines whether the terminal has sent a channel request message on a frame whose frame number is indicated by the offset value. If yes, proceed to step 203; and if not, proceed to step 204.

Step 203: The terminal parses a channel request message in the immediate assignment message, and determines whether the channel request message is consistent with a channel request message that is sent by the terminal on a frame whose frame number is indicated by the offset value. If yes, proceed to step 205; and if not, proceed to step 204.

Step 204: The terminal ignores the immediate assignment message.

Step 205: The terminal parses a packet resource parameter in the immediate assignment message, and obtains a packet resource.

In this embodiment of the present invention, each terminal parses an immediate assignment message, where the immediate assignment message assigns a packet resource for at least two terminals; and the immediate assignment message is optimized by reducing the number of bits occupied in the immediate assignment message by a parameter relevant to a frame number, so that one immediate assignment message can assign a packet resource for multiple terminals, and an immediate assignment requirement of random access of a large number of terminals can be met.

Embodiment 3

A method for resource immediate assignment is described in detail in this embodiment in combination with a terminal. The method for resource immediate assignment includes:

Each terminal sends a channel request message, for example, terminals A, B, and C send a channel request message 1, a channel request message 2, and a channel request message 3 on frames whose frame numbers are 5, 6, and 7 respectively. After sending a channel request message, a terminal monitors, on an AGCH channel, an IA message that allocates a resource for the terminal.

In the same way, reference may be made to FIG. 1.

Step 101: A base station calculates an offset value between a designated frame number of a downlink immediate assignment message and a frame number of an uplink request message of each terminal according to a frame number of a channel request message of each terminal.

It is assumed that the designated frame number of the downlink immediate assignment message is 13, so that an offset value between the designated frame number and the channel request message 1 of terminal A is 8, namely, a difference value between 13 and 5, an offset value between the designated frame number and the channel request message 2 of terminal B is 7, and an offset value between the designated frame number and the channel request message 3 of terminal C is 6.

Step 102: The base station sequentially combines channel request messages of three terminals, offset values between the channel request messages of the three terminals and an immediate assignment message, and packet resource parameters that are allocated for the three terminals into an immediate assignment message.

Figures 3, 4:
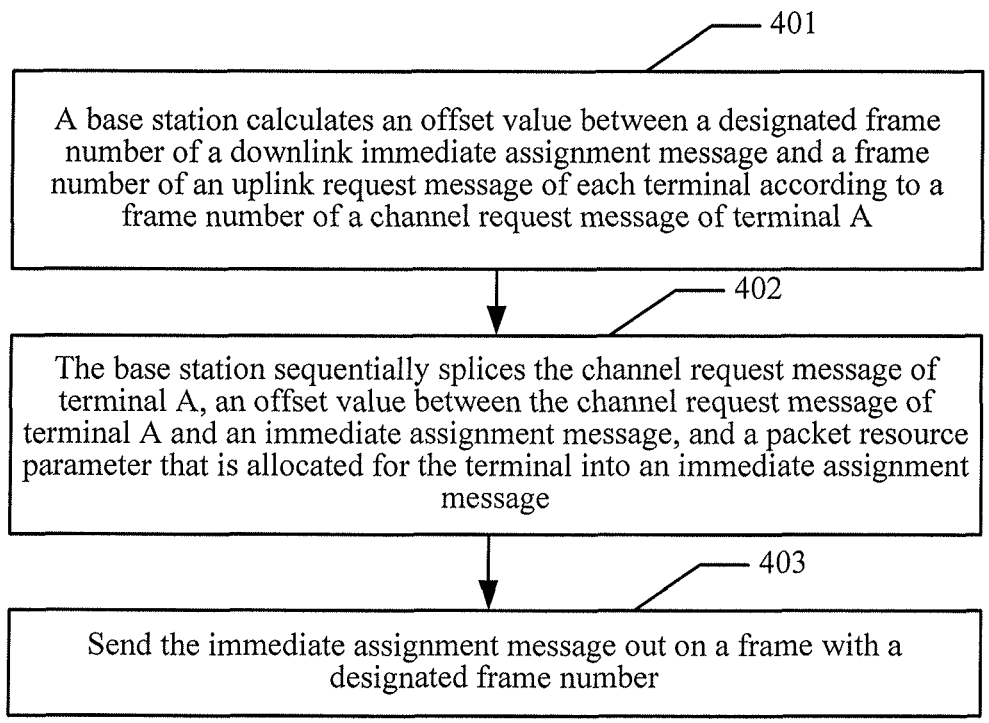
FIG. 3 is a schematic diagram of an immediate assignment message according to Embodiment 3 of the present invention.
FIG. 4 is a flow chart of a method for resource immediate assignment according to Embodiment 4 of the present invention.

Specifically, offset values of the channel request messages are combined into an offset value field, the channel request messages of the terminals are combined into a channel request message field, and the packet resource parameters allocated for the terminals are combined into a parameter field, and then the offset value field, the channel request message field, and the parameter field are sequentially combined into an immediate assignment message. Reference may be made to FIG. 3 for a schematic diagram of an immediate assignment message.

The number of bits required for a manner of recording an offset value is smaller than the number of bits required for a manner of recording a frame number, which has been specifically described in Embodiment 1 and is not described herein again. In addition, to reduce the number of bits of an immediate assignment message to a greater extent, only mandatory parameters in a packet resource parameter may be combined into the immediate assignment message. For example, contents included in the packet resource parameter are shown in the following Table 2:

TABLE 2

| Name | Length |
|---|---|
| TA time advance, indicating a terminal send uplink data in advance of how many pulse codes | 6 bit |
| Uplink modulation-coding manner indication, indicating a specific encoding manner of GPRS/EGPRS/EGPRS2 | 5 bit |
| Frequency parameter | 10 bit |
| Time slot parameter | 3-8 bit |
| USF parameter, N 3 bits, where N indicates the number of used uplink time slots | 3 bit |
| TFI parameter | 5 bit |
| TSC training sequence indication | 3 bit |
| Uplink power control parameter | 9 bit |
| . . . | . . . |

In the foregoing table, parameters above the TFI are necessary and mandatory parameters, if only mandatory parameters are combined into an immediate assignment message, an immediate assignment message that allocates an uplink resource for one terminal needs 11+7+6+5+10+3+3+5=50 bit at least. Because the IA message includes valid bytes of 176 bits, one immediate assignment message can allocate an uplink resource for three terminals, and allocating a packet uplink resource for one terminal needs 11+9+6+5+12+8+3+5=59 bit at most. In this way, one immediate assignment message can allocate an uplink resource for two terminals.

By configuring a packet resource parameter to a default value, occupied bit space of the immediate assignment message may also be reduced. For example, an uplink modulation-coding manner is set to MCS-1 of EGPRS modulation by default; and in this way, in the IA message, an uplink modulation-coding manner parameter does not need to be delivered. For example, a frequency parameter, if the frequency parameter also uses a default value, for example, uses the same frequency point as that of a BCCH channel by default and does not use frequency hopping, or uses another frequency defined in advance, the frequency parameter does not need to be delivered either. This manner of adopting a default value of a parameter not only can be used for the foregoing mandatory parameters, but also can be used for an optional parameter.

Through the foregoing two methods, by using a method of using an offset value to indicate time information of a channel request message sent by a terminal and a method of adopting a pre-configured packet resource parameter or only delivering a required packet resource parameter, the number of bits of the immediate assignment message can be reduced. The two methods may not be used in combination, and one of the methods may be used alone, so as to enable one immediate assignment message to assign a resource for multiple terminals by reducing the number of bits.

After the immediate assignment message is sent, each terminal that monitors the AGCH channel may monitor the immediate assignment message, and reference may also be made to FIG. 2.

For terminal A, the following steps are performed:

Step 201: When monitoring an immediate assignment message, terminal A obtains, by parsing the immediate assignment message, that offset values of the immediate assignment message are 6, 7, and 8.

Step 202: If terminal A determines that terminal A has sent a channel request message on a frame indicated by the offset value 8, proceed to step 203.

Step 203: Terminal A obtains, by parsing the immediate assignment message, that a channel request message corresponding to the offset value 8 is a channel request message 1. If terminal A determines that the channel request message 1 obtained through parsing is consistent with a channel request message 1 sent by terminal A on a frame number 5, proceed to step 205.

Step 205: Continue to parse a packet resource parameter that corresponds to the channel request message 1, and obtain a packet resource.

In the same way, terminal B and terminal C also monitor an immediate assignment message, and parse the immediate assignment message, and obtain a packet resource of terminal B and a packet resource of terminal C.

If terminal D also monitors the AGCH, terminal D monitors the immediate assignment message.

If terminal D has sent a channel request message 4 on a frame number 8, terminal D also monitors the AGCH and monitors the immediate assignment message.

For terminal D, the following steps are performed:

Step 201: When monitoring an immediate assignment message, terminal D obtains, by parsing the immediate assignment message, that offset values of the immediate assignment message are 6, 7, and 8.

Step 202: If terminal D determines that terminal D has sent a channel request message on a frame indicated by the offset value 8, proceed to step 203.

Step 203: Terminal D obtains, by parsing the immediate assignment message, that a channel request message corresponding to the offset value 8 is a channel request message 1. If terminal D determines that the channel request message 1 obtained through parsing is not consistent with a channel request message 4 sent by terminal D on a frame number 5, proceed to step 204.

Step 204: Ignore the immediate assignment message.

If terminal E has sent a channel request message 5 on a frame number 9, terminal E also monitors the AGCH and monitors the immediate assignment message.

For terminal E, the following steps are performed:

Step 201: When monitoring an immediate assignment message, terminal E obtains, by parsing the immediate assignment message, that offset values of the immediate assignment message are 6, 7, and 8.

Step 202: If terminal E determines that terminal E does not send a channel request message on frames indicated by the offset values 6, 7, and 8, proceed to step 204.

Step 204: Ignore the immediate assignment message.

In this embodiment, an offset value between a designated frame number of a downlink immediate assignment message and a frame number of an uplink request message of each terminal is calculated according to a frame number of a channel request message of each terminal; and an immediate assignment message is constructed according to the offset value, the channel request message, and a packet resource parameter of each terminal; and whether a terminal has sent a channel request message on a designated frame number is distinguished through the offset value, so that the number of bits occupied in the immediate assignment message by a parameter relevant to a frame number is reduced, thereby reducing the number of time slots that bear the immediate assignment message. In a case that a channel resource is unchanged, one immediate assignment message can assign a packet resource for more terminals, thereby satisfying a random access requirement of a large number of MTC terminals. The number of bits occupied by a parameter relevant to a frame number and occupied by a packet resource parameter in the immediate assignment message is reduced, so that the immediate assignment message is optimized, one immediate assignment message can assign a packet resource for multiple terminals, and an immediate assignment requirement of random access of the MTC terminals can be met.

Embodiment 4

FIG. 4 is a flow chart of a method for resource immediate assignment according to this embodiment. The method for resource immediate assignment in this embodiment includes:

Step 401: A base station calculates an offset value between a designated frame number of a downlink immediate assignment message and a frame number of an uplink request message of each terminal according to a frame number of a channel request message of terminal A.

Step 402: The base station sequentially combines the channel request message of terminal A, an offset value between the channel request message of terminal A and an immediate assignment message, and a packet resource parameter that is allocated for the terminal A into an immediate assignment message.

According to the description in Embodiment 3, it can be known that, at most 59 bits are needed for allocating a packet resource for one terminal. However, in the prior art, an immediate assignment message has 176 bits, and four time slots are needed to bear the immediate assignment message. In this embodiment, the number of bits required for bearing the immediate assignment message is reduced, and the number of time slots that bear the immediate assignment message can be compressed and one half of the original number of the time slots is enough for bearing an immediate assignment message that assigns a resource for one terminal.

Step 403: Send the immediate assignment message out. Because the number of bits of the immediate assignment message is smaller than 176 bits that needs to be borne by four time slots, and only two time slots are needed for bearing.

In this embodiment of the present invention, the number of bits of the immediate assignment message is reduced in at least two manners, and a valid byte of the immediate assignment message is saved, so that the number of time slots that bear the immediate assignment message may be reduced. In a case that a time slot resource is unchanged, one immediate assignment message can assign a packet resource for more terminals, thereby satisfying a random access requirement of a large number of MTC terminals.

Embodiment 5

Figure 5:
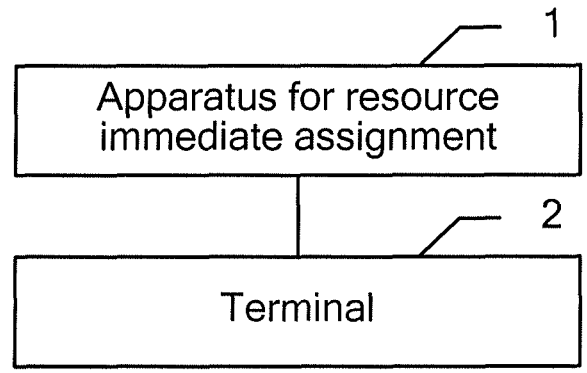
FIG. 5 is a schematic structural diagram of a communication system according to Embodiment 4 of the present invention.

A communication system that performs steps of the foregoing methods and is provided in Embodiment 5 of the present invention is described in the following. FIG. 5 is a schematic structural diagram of a communication system according to this embodiment. The communication system may be used for resource immediate assignment and the communication system includes:

a base station subsystem 1, configured to construct an immediate assignment message according to channel request messages of at least two terminals, where the immediate assignment message assigns a packet resource for the channel request messages of the at least two terminals; and send the immediate assignment message out; and a terminal 2, configured to monitor an immediate assignment message of an access grant channel, where the immediate assignment message allocates a resource parameter for at least two terminals; decode the immediate assignment message and determine whether the immediate assignment message assigns a packet resource parameter for a terminal; if yes, obtain a resource that is allocated by the immediate assignment message for the terminal; and if not, discard the immediate assignment message.

Figure 6:
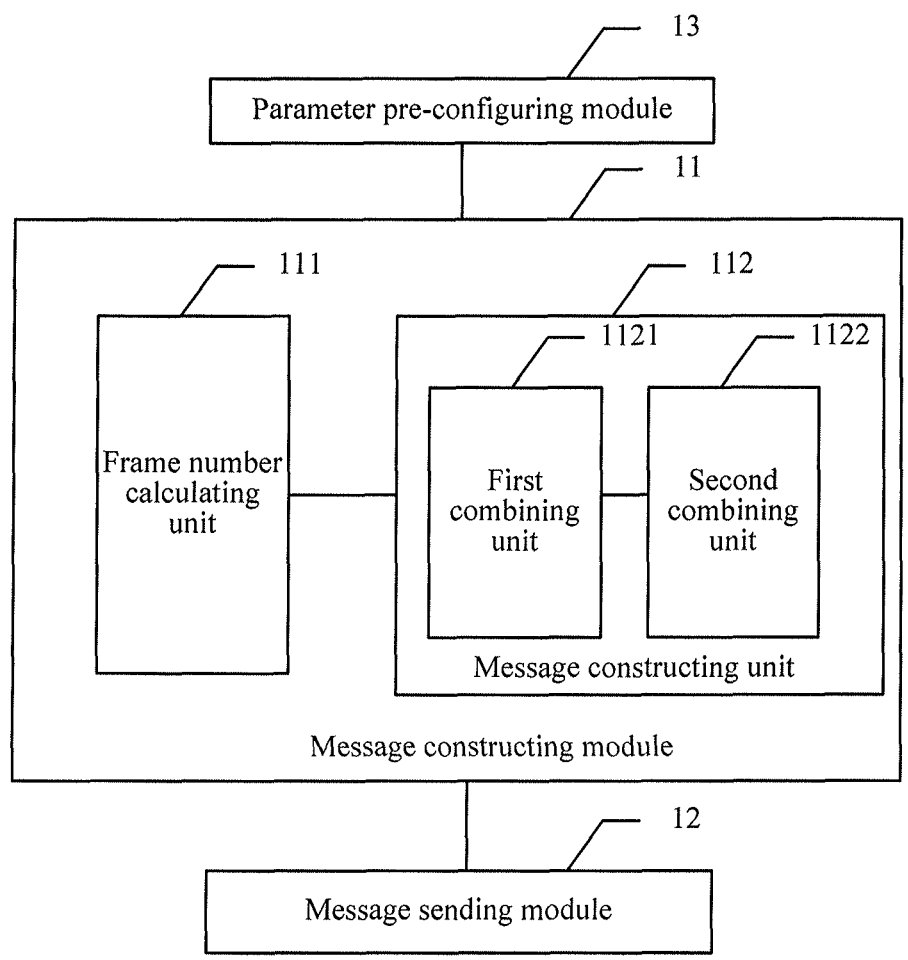
FIG. 6 is a schematic structural diagram of a base station subsystem according to Embodiment 4 of the present invention.

FIG. 6 is a schematic structural diagram of an apparatus for resource immediate assignment according to this embodiment. The apparatus for resource immediate assignment 1 includes:

a message constructing module 11, configured to construct an immediate assignment message according to channel request messages of at least two terminals, where the immediate assignment message assigns a packet resource for the channel request messages of the at least two terminals; and a message sending module 12, configured to send the immediate assignment message out.

Specifically, the message constructing module 11 includes:

a message constructing unit 112, configured to combine time information of channel request messages sent by terminals, the channel request messages, and packet resource parameters allocated for the terminals into an immediate assignment message.

Preferably, the message constructing module 11 further includes:

a frame number calculating unit 111, configured to calculate an offset value between a designated frame number of a downlink immediate assignment message and a frame number of an uplink request message of each terminal according to a frame number of a channel request message of each terminal, and use the offset value as time information of a channel request message sent by a terminal.

Preferably, the message constructing unit 112 further includes:

a first combining unit 1121, configured to combine offset values of terminals into an offset value field, combine channel request messages of the terminals into a channel request message field, and combine packet resource parameters allocated for the terminals into a parameter field; and a second combining unit 1122, configured to sequentially combine the offset value field, the request message field, and the parameter field into an immediate assignment message.

Preferably, the base station subsystem further includes:

a parameter pre-configuring module 13, configured to pre-configure a packet resource parameter to a default value, where the packet resource parameter that is pre-configured to the default value is not included in the immediate assignment message.

In this embodiment, the apparatus for resource immediate assignment 1 may be, for example, a base station or a base station subsystem.

Figure 7:
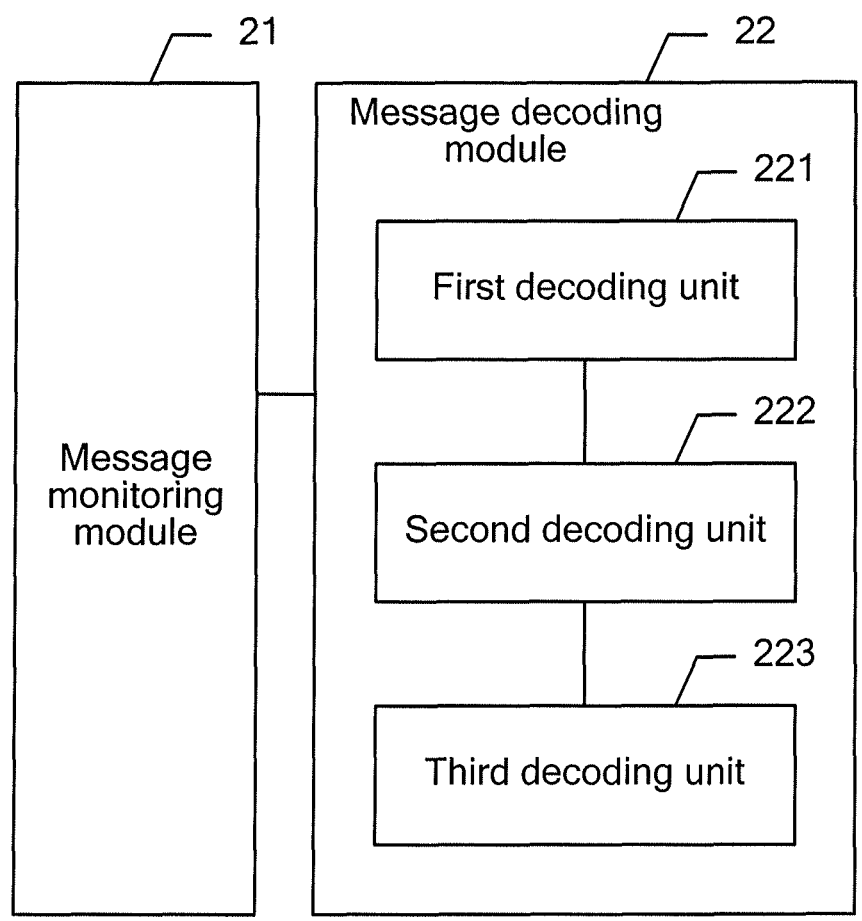
FIG. 7 is a schematic structural diagram of a terminal according to Embodiment 4 of the present invention.

FIG. 7 is a schematic structural diagram of a terminal according to this embodiment. The terminal 2 includes:

a message monitoring module 21, configured to monitor an immediate assignment message of an access grant channel, where the immediate assignment message allocates a resource parameter for at least two terminals;

a message decoding module 22, configured to decode the immediate assignment message and determine whether the immediate assignment message assigns a packet resource parameter for a terminal; if yes, obtain a resource that is allocated by the immediate assignment message for the terminal; and if not, ignore the immediate assignment message.

Preferably, the message decoding module 22 includes:

a first parsing unit 221, configured to parse each offset value carried by the immediate assignment message, and determine whether the terminal has sent a channel request message on a frame whose fame number is indicated by the offset value;

a second parsing unit 222, configured to, when the first parsing unit determines to be yes, parse a channel request message carried by the immediate assignment message; and a third parsing unit 223, configured to, when the channel request message parsed by the second parsing unit is consistent with a channel request message sent by the terminal, parse a packet resource parameter carried by the immediate assignment message.

In this embodiment, an offset value between a designated frame number of a downlink immediate assignment message and a frame number of an uplink request message of each terminal is calculated according to a frame number of a channel request message of each terminal; and an immediate assignment message is constructed according to the offset value, the channel request message, and a packet resource parameter of each terminal; and whether a terminal has sent a channel request message on a designated frame number is distinguished through the offset value, so that the number of bits occupied in the immediate assignment message by a parameter relevant to a frame number is reduced. In one aspect, in a case that a valid byte of the immediate assignment message is unchanged, one immediate assignment message can assign a packet resource for multiple terminals, thereby satisfying a random access requirement of a large number of MTC terminals; and in another aspect, the invalid byte of the immediate assignment message may be saved by reducing the number of bits of a parameter relevant to a frame number, so that the number of time slots that bear the immediate assignment message may be reduced, and in a case that a time slot resource is unchanged, one immediate assignment message can assign a packet resource for more terminals, thereby satisfying a random access requirement of a large number of MTC terminals.

Persons of ordinary skill in the art may understand that all or part of the steps of the methods in the foregoing embodiments may be implemented by a program instructing relevant hardware. The program may be stored in a computer readable storage medium. The storage medium may include a ROM, a RAM, a magnetic disk, or an optical disk, and the like.

The method, apparatus and system provided in the embodiments of the present invention are described in detail in the foregoing. A principle and an implementation manner of the present invention are described in this specification through specific examples. The description about the foregoing embodiments is merely used for helping understand the method and core ideas of the present invention. Meanwhile, persons of ordinary skill in the art may make variations in terms of the specific implementation manner and application scope according to the ideas of the present invention. Therefore, contents of the specification shall not be construed as a limitation to the present invention.

What is claimed is:

1. A method for resource immediate assignment, comprising:

constructing an immediate assignment message according to channel request information of at least two terminals, wherein the channel request information is used to indicate the terminals request a channel resource, and the channel resource is a packet resource, and the immediate assignment message comprises a channel resource assigned for each of the at least two terminals and wherein the constructing comprises combining time information of the channel request information sent by the terminals, the channel request information, and packet resource parameters allocated for the terminals into the immediate assignment message; and sending the immediate assignment message out.

2. The method according to claim 1, wherein the time information of the channel request information sent by the terminal is an offset value between a frame number of the immediate assignment message and a frame number of the request information of the terminals.

3. The method according to claim 1, wherein the packet resource parameter comprises an optional parameter and a mandatory parameter, and the immediate assignment message carries only the mandatory parameter.

4. The method according to claim 1, wherein the combining time information of the channel request information sent by the terminals, the channel request information, and the packet resource parameters into the immediate assignment message comprises:

combining the time information of the channel request information of the terminals into an offset value field, combining the channel request information of the terminals into a channel request information field, and combining the packet resource parameters allocated for the terminals into a parameter field; and combining the offset value field, the request information field, and the parameter field into an immediate assignment message.

5. The method according to claim 1, wherein the packet resource parameter is pre-configured to a default value, and the packet resource parameter that is pre-configured to the default value is not comprised in the immediate assignment message.

6. A method for resource immediate assignment, comprising:

monitoring, by a terminal, an immediate assignment message, wherein the immediate assignment message comprises a channel resource assigned for each of at least two terminals and wherein the immediate assignment message comprises combined time information of the channel request information sent by the terminals, the channel request information, and packet resource parameters allocated for the terminals into the immediate assignment message;

decoding the immediate assignment message and determining whether the immediate assignment message assigns a channel resource parameter for the terminal terminals; if yes, obtaining a resource that is allocated by the immediate assignment message for the terminal.

7. The method according to claim 6, wherein the channel resource is a packet resource, and the determining whether the immediate assignment message assigns a channel resource parameter for the terminal comprises:

parsing each offset value carried by the immediate assignment message and determining whether the terminal has sent channel request information on a frame whose frame number is indicated by the offset value; parsing channel request information carried by the immediate assignment message, wherein if the parsed channel request information is consistent with the channel request information sent by the terminal, the immediate assignment message assigns a packet resource parameter for the terminal.

8. A base station subsystem, comprising:

a message constructing module, configured to construct an immediate assignment message according to channel request information of at least two terminals, wherein the channel request information is used to indicate the terminals request a channel resource, and the immediate assignment message comprises a channel resource assigned for each of the at least two terminals and wherein the message constructing module comprises a message constructing unit, configured to combine time information of the channel request information sent by the terminals, the channel request information, and packet resource parameters allocated for the terminals into the immediate assignment message, wherein the immediate assignment message is used to assign a packet resource for the terminals; and a message sending module, configured to send the immediate assignment message out.

9. The base station subsystem according to claim 8, wherein the message constructing module further comprises:

a frame number calculating unit, configured to calculate an offset value between a designated frame number of the immediate assignment message and a frame number of the request information of each of the terminals according to a frame number of channel request information of each of the terminals, and use the offset value as time information of channel request information sent by the terminal.

10. The base station subsystem according to claim 8, wherein the base station subsystem further comprises:

a parameter pre-configuring module, configured to pre-configure a packet resource parameter to a default value, wherein the packet resource parameter that is pre-configured to the default value is not comprised in the immediate assignment message.

11. The base station subsystem according to claim 8, wherein the message constructing unit comprises:

a first combining unit, configured to combine offset values of the terminals into an offset value field, combine the channel request information of the terminals into a channel request information field, and combine the packet resource parameters allocated for the terminals into a parameter field; and a second combining unit, configured to combine the offset value field, the request information field, and the parameter field into an immediate assignment message.

12. A terminal, comprising:

a message monitoring module, configured to monitor an immediate assignment message of an access grant channel, wherein the immediate assignment message comprises a channel resource assigned for each of at least two terminals and wherein the immediate assignment message comprises combined time information of the channel request information sent by the terminals, the channel request information, and packet resource parameters allocated for the terminals into the immediate assignment message; and a message decoding module, configured to decode the immediate assignment message and determine whether the immediate assignment message assigns a channel resource parameter for the terminal; if yes, obtain a resource that is allocated by the immediate assignment message for the terminal.

13. The terminal according to claim 12, wherein the message decoding module comprises:

a first parsing unit, configured to parse each offset value carried by the immediate assignment message, and determine whether the terminal has sent channel request information on a frame whose frame number is indicated by the offset value;

a second parsing unit, configured to, when the first parsing unit determines to be yes, parse channel request information carried by the immediate assignment message; and a third parsing unit, configured to, when the channel request information parsed by the second parsing unit is consistent with channel request information sent by the terminal, parse a packet resource parameter carried by the immediate assignment message.

* * * * *